March 18, 1924.  1,487,221

P. EHRMANN

DEVICE FOR COOLING ELECTRIC MACHINES

Filed March 28, 1921

Inventor:
Paul Ehrmann

Patented Mar. 18, 1924.

1,487,221

UNITED STATES PATENT OFFICE.

PAUL EHRMANN, OF PARIS, FRANCE.

DEVICE FOR COOLING ELECTRIC MACHINES.

Application filed March 28, 1921. Serial No. 456,136.

(GRANTED UNDER THE PROVISIONS OF THE ACT OF MARCH 3, 1921, 41 STAT. L., 1313.)

*To all whom it may concern:*

Be it known that I, PAUL EHRMANN, a citizen of the Republic of France, residing at Paris, France, have invented certain new and useful Improvements in Devices for Cooling Electric Machines (for which I have filed applications in France, No. 497,839, Apr. 4, 1919; Switzerland, Mar. 17, 1920; Germany, April 15, 1920; Belgium, April 21, 1920; England, May 4, 1920, Patent No. 142,828), of which the following is a specification.

My invention relates to cooling arrangements for the laminated masses of electric machinery and has for its object to provide laminated masses which are regularly cooled and which present considerable cooling surfaces.

A laminated mass of an electric machine, according to my invention, comprises essentially main cooling channels which communicate with the outside only at one of their extremities and which are in communication with each other by secondary conduits.

Figure 1:
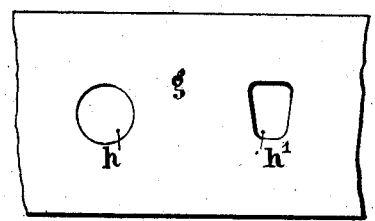
Figure 3:
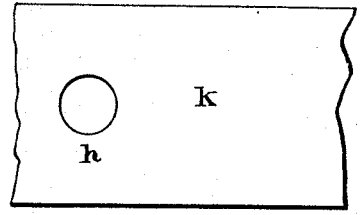
Figure 2:
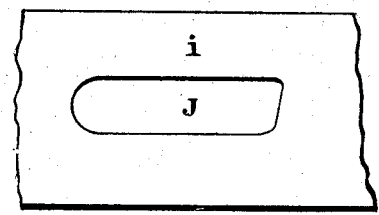
Figure 5:
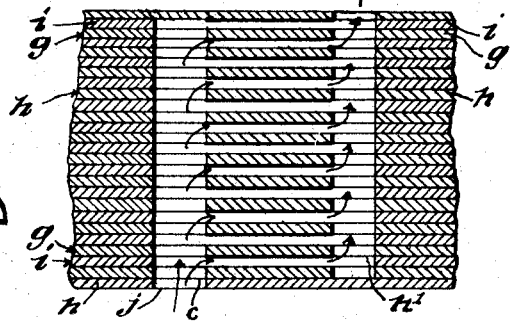
Figure 4:
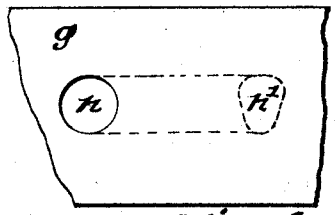

A preferred embodiment of my invention is shown on the annexed drawing, on which Figs. 1, 2 and 3 are three partial elevations of plates provided with openings of various shapes, which when the plates are superposed, constitute the net of cooling channels of the laminated mass.—Fig. 4 is an elevation of a mass of assembled superposed plates, and Fig. 5 a section along 5—5 in Fig. 4.

The cooling arrangement shown on the drawing is produced by superposing plates $g$ provided with two separate openings $h$ and $h^1$ and plates $i$ provided with elongated openings $j$, the extremities of which overlie the openings $h$ and $h^1$. The pile of plates thus produced is closed at each end with plates $k$ provided with but a single opening $h$ or $h^1$. This results in a laminated mass, a section through which is shown in Fig. 5, where the circulation of the cooling fluid is indicated by arrows. As will be seen at a glance, the cooling surface is considerable and the cooling fluid comes in full contact with this entire surface.

It will be readily seen that all the air currents follow lines of the same resistance and there experience the same losses of charge. All the secondary conduits which are parallel to the surfaces of the plates are therefore uniformly cooled. Thus one obtains a very thorough cooling of the total laminated mass.

In the foregoing example it is supposed that the plates $g$ and $i$ are alternately superposed one upon the other. Evidently, one can produce these liminated masses also in superposing first a certain number of plates $g$ and then a certain number of plates $i$. One obtains also a laminated mass entirely analogous to that shown in Fig. 5 in that each plate $g$ or $i$ is replaced by a group of plates $g$ or $i$.

I claim as my invention:

A laminated mass for electric machines, comprising a front plate provided with an air-inlet opening, a back plate provided with an air-outlet opening off-set relative to the said air-inlet opening, a plurality of plates intermediate the said front and the said back plate, each provided with an opening in line with the said air-inlet opening, and an opening in line with the said air-outlet opening, and plates interposed between the said other plates provided with an elongated opening, having its ends in line both with the said air-inlet and the said air-outlet openings of the said front and back plates.

In testimony whereof I have affixed my signature in presence of two witnesses.

PAUL EHRMANN.

Witnesses:
 LOUIS GARDES,
 HENRI MONIN.